D. M. SCOTT.
SIGNALING DEVICE.
APPLICATION FILED OCT. 11, 1915.
1,197,862. Patented Sept. 12, 1916.
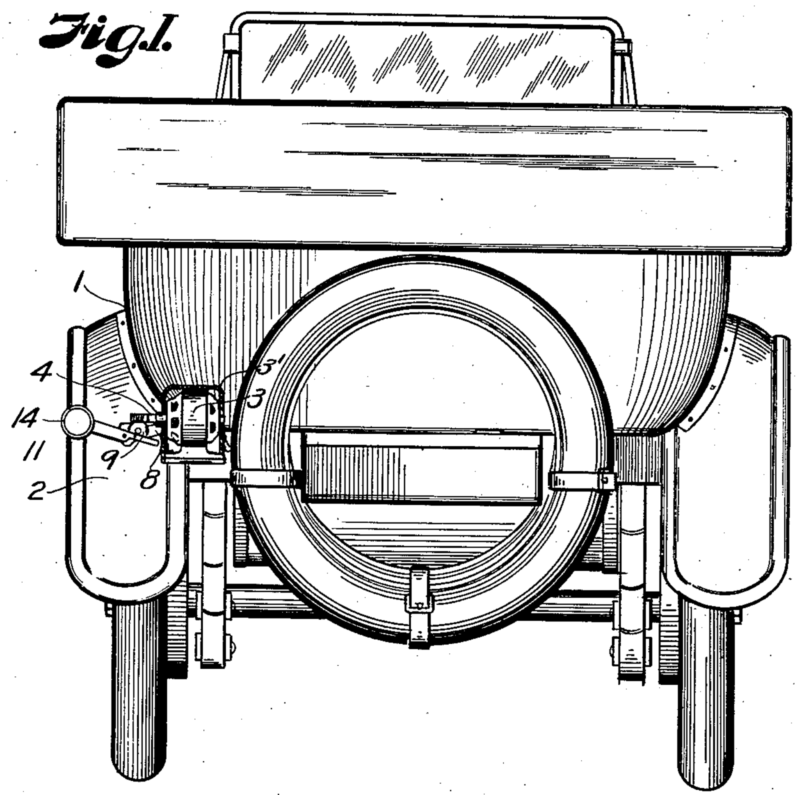
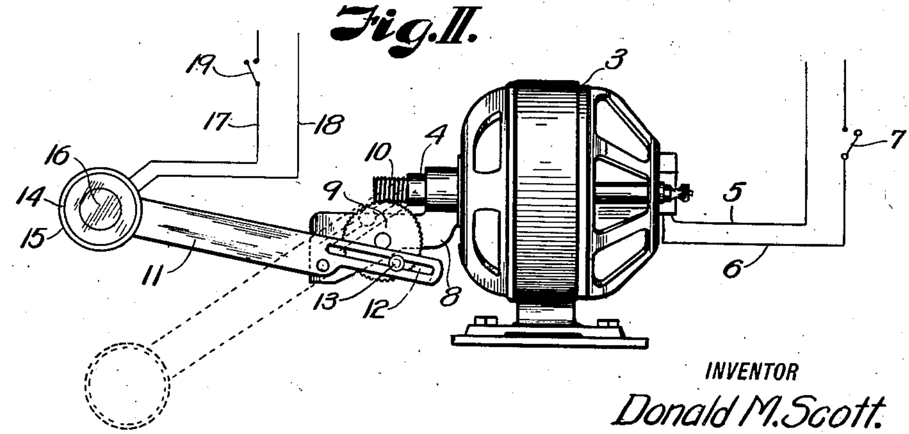
INVENTOR
Donald M. Scott.
BY
Arthur C. Brown
ATTORNEY

UNITED STATES PATENT OFFICE.

DONALD M. SCOTT, OF KANSAS CITY, MISSOURI.

SIGNALING DEVICE.

1,197,862. Specification of Letters Patent. Patented Sept. 12, 1916.

Application filed October 11, 1915. Serial No. 55,210.

*To all whom it may concern:*

Be it known that I, DONALD M. SCOTT, a citizen of the United States, residing at Kansas City, in the county of Jackson and State of Missouri, have invented certain new and useful Improvements in Signaling Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a signaling device and more particularly to a device of this character for use on motor driven vehicles, the principal object of the invention being to warn the driver of a vehicle following that upon which the signal is carried that the forward vehicle is about to stop or change its direction of travel.

It is also an object of the invention to provide a signaling device of this character which may comprise the usual tail light, so that the device may be used at night as well as in the day time, and without the necessity of an additional lamp.

In accomplishing these objects I have provided improved details of structure, the preferred forms of which are illustrated in the accompanying drawings, wherein:

Figure I is a perspective view of a motor driven vehicle, illustrating the use of the invention. Fig. II is an enlarged detail view of the signaling device, including the circuit diagram.

Referring more in detail to the drawings: 1 designates a motor driven vehicle of any ordinary type. Mounted on the vehicle in any suitable position, but here shown to be secured on the rear fender 2, is a motor 3, which is preferably inclosed in a casing 3′ and comprising a drive shaft 4 and circuit wires 5—6, the latter including a switch 7 that is located adjacent the driver's position so that the motor may be energized by the driver of the vehicle without inconvenience. Mounted on the motor, adjacent the drive shaft 4, is a bracket 8, and rotatably mounted on the bracket is a worm wheel 9 that meshes with a worm section 10 on the motor shaft, so that when the motor is energized the wheel 9 will revolve.

Pivotally mounted on the bracket 8 is an arm 11, having a slot 12 at one end thereof, and secured on the wheel 9, near its circumference, is a pin 13 which is projected through the slot 12 and is adapted for traveling therein, in order that when the wheel 9 is revolved by the rotation of the worm section 10, it will impart a rocking motion to the arm 11.

Mounted on the arm 11 at the end opposite the slot 12 is a tail light 14, having a housing 15, and located in said housing is a lamp 16, preferably of an electrical type and having circuit wires 17—18 that may be connected with any suitable source of supply and are controlled by a switch 19, so that the lamp may be turned on or off as desired, the lamp 16 being intended for use as the tail light of the vehicle in place of the ordinary fixed tail light.

In using the device, assuming the parts to be constructed as described, and mounted on the vehicle, when the signal is used at night the tail light is lighted, so that it performs its usual function. When it is desired to warn the driver of a following vehicle that the forward vehicle is about to stop or change its direction of travel, the driver of the forward vehicle closes the circuit through the motor 3 and the motor revolves the drive shaft 4. The shaft 4 meshing with the wheel 9, revolves the wheel and rocks the arm 11 so that the light will move up and down to attract the attention of and to warn the driver of a following vehicle that the vehicle carrying the light is about to stop or change its direction of travel. As soon as the vehicle has stopped or resumed its straight line travel the motor is stopped by opening the contacting circuit and the lamp again assumes the position of an ordinary tail light, it being apparent that the lamp may stop at any point between its limits of travel, and serves the ordinary purpose when in such position.

The use of the device in the day time is similar to that just described, except that the lamp need not be lighted, as the signal can be seen by the driver of a following vehicle without the illumination.

Having thus described my invention, what I claim as new therein, and desire to secure by Letters-Patent, is:

The combination with a motor having a shaft provided with a worm section, of a bracket mounted on and supported by said motor, a worm wheel rotatably mounted on said bracket, a signal arm pivotally mounted on said bracket and having a slot therein, and a pin eccentrically mounted on the worm wheel and slidably mounted in the arm slot.

In testimony whereof I affix my signature.

DONALD M. SCOTT.